United States Patent
Ritter

(10) Patent No.: US 7,298,125 B1
(45) Date of Patent: Nov. 20, 2007

(54) RIGHT HALF-PLANE ZERO COMPENSATION AND CANCELLATION FOR SWITCHING REGULATORS

(75) Inventor: David W. Ritter, San Jose, CA (US)

(73) Assignee: Micrel, Incorporated, San Jose, CA (US)

( * ) Notice: Subject to any disclaimer, the term of this patent is extended or adjusted under 35 U.S.C. 154(b) by 0 days.

(21) Appl. No.: 11/380,364

(22) Filed: Apr. 26, 2006

(51) Int. Cl.
*G05F 1/56* (2006.01)
*G05F 1/575* (2006.01)

(52) U.S. Cl. .................................... 323/288
(58) Field of Classification Search ............. 323/222, 323/282, 288, 242, 326
See application file for complete search history.

(56) References Cited

U.S. PATENT DOCUMENTS

| | | | |
|---|---|---|---|
| 4,774,478 A * | 9/1988 | Taylor | 330/294 |
| 5,204,639 A * | 4/1993 | Moore et al. | 330/294 |
| 6,252,383 B1 | 6/2001 | Wittenbreder | |
| 6,522,115 B1 * | 2/2003 | Greitschus | 323/288 |
| 6,914,476 B2 * | 7/2005 | Ingino, Jr. | 327/540 |
| 2006/0176098 A1 * | 8/2006 | Chen et al. | 327/341 |
| 2007/0030074 A1 * | 2/2007 | Ritter | 330/292 |

* cited by examiner

Primary Examiner—Gary L Laxton
(74) Attorney, Agent, or Firm—Bever, Hoffman & Harms, LLP; Jeanette S. Harms

(57) ABSTRACT

An improved method of canceling a RHPZ of a switching regulator can include detecting a predetermined error signal provided to a pulse width modulation (PWM) circuit, wherein the predetermined error signal is associated with the RHPZ. Once a RHPZ is detected, a ramp waveform provided to the PWM circuit can be temporarily lengthened, thereby canceling the RHPZ. Notably, temporarily lengthening the ramp waveform can be based on adjusting an RZ*CZ time constant. In one embodiment, the ramp waveform can be lengthened to create a left half-plane zero (LHPZ), which improves stability.

9 Claims, 5 Drawing Sheets

RIGHT HALF-PLANE ZERO COMPENSATION AND CANCELLATION FOR SWITCHING REGULATORS

BACKGROUND OF THE INVENTION

1. Field of the Invention

The present invention relates to a switching regulator and in particular to a switching regulator that eliminates the right half-plane zero phenomenon.

2. Related Art

Switching regulators typically include a pulse-width modulation (PWM) circuit running at a fixed frequency. FIG. 1A illustrates a conventional switching regulator 100 including a comparator 111 that drives a switch 119, e.g. a large NMOS or NPN device, wherein comparator 111 and switch 119 implement the PWM circuit. When switch 119 is "on" (called a charge time), an inductor 109 is charged, thereby causing the current in inductor 109 to increase. In contrast, when switch 119 is "off" (called a discharge time), inductor 109 supplies current/voltage to an output node 115 via a diode 116.

Notably, adjusting the duty cycle of the PWM circuit, i.e. the ratio of the "on" time of switch 119 divided by its period ("on" i+"off" time), can control the voltage/current supplied to output node 115. To adjust the duty cycle, switching regulator 100 can provide a feedback signal VFBK from output node 115 to a negative input terminal of an error amplifier 102 (e.g. a gm stage). Error amplifier 102 compares feedback signal VFBK to a known feedback reference 101 (voltage/current), which is provided on its positive input terminal. If feedback signal VFBK is less than feedback reference 101, thereby indicating that more output voltage/current is required, then error amplifier 102 drives an error signal VERROR higher using a parasitic element 103 (which represents the output impedance of error amplifier 102), a compensation zero resistor 104, and a compensation capacitor 105 (wherein parasitic element 103, compensation zero resistor 104, and compensation capacitor 105 result in a compensation time constant that can provide circuit stability).

Comparator 111 receives error signal VERROR on its negative input terminal and a ramping signal VRAMP on its positive input terminal. A higher error signal VERROR relative to ramping signal VRAMP causes comparator 111 to turn on transistor 119 longer, thereby increasing the duty cycle of the PWM circuit. The increased duty cycle, in turn causes the charge time of inductor 109 to be increased, thereby ultimately resulting in a higher output voltage/current during discharge time.

In this embodiment, ramp generator 120 includes a comparator 112, a transistor 114, and a capacitor 113. Comparator 112 drives a transistor 114, which is connected between ground and a positive input terminal of comparator 112. Capacitor 113 is connected between ground VSS and the positive input terminal of comparator 112. Current source 110 is connected between a voltage source VDD and the positive input terminal of comparator 112. Inductor 109 is connected between diode 116 and a node between voltage VDD and current source 110. Comparator 112 compares the current/voltage on its positive input terminal to a ramp reference (current/voltage) 107.

In this configuration, comparator 112 operates by allowing capacitor 113 to charge via current source 110 until a ramp signal VRAMP reaches a reference voltage VRREF, which is generated by ramp reference 107. At this point, the output of comparator 112 switches high, thereby turning on transistor 114 and discharging capacitor 113 to start the next cycle. Note that comparator 112 typically has sufficient hysteresis to guarantee that capacitor 113 is fully discharged on each cycle. Thus, ramp generator 120 operates as an oscillator that generates a ramp waveform 121 (corresponding to ramp signal VRAMP), shown in FIG. 1B. Ramp waveform 121 has an associated charge time 122 (i.e. associated with turning on switch 119 and charging inductor 109) and an associated discharge portion 123 (i.e. associated with turning off switch 119 and discharging inductor 109). In a first cycle of ramp waveform 121, the duty cycle of the PWM circuit is 50% (i.e. the on/off times of switch 119 are equal).

In actual operation, an external load 118 connected to output node 115 can vary. For example, a load 118 including 2 "on" LEDs could change to have 4 "on" LEDs. In this case, the feedback loop should respond by increasing the duty cycle to generate more output to compensate for the additional load. To increase the duty cycle, the charge time is increased (i.e. switch 119 is turned on longer). However, a necessary side effect of increasing the charge time is a decrease in the corresponding discharge time in the cycle. That is, in waveform 121, a charge time 124 would be increased relative to a discharge time 125, but the period remains the same. Because current is supplied to output node 115 only during the discharge time, there is an instantaneous drop in output current/voltage whenever the feedback loop asks for more output. Within one or more cycles, the increase in the charge time (e.g. charge time 124) ramps up the current in inductor 109 enough to overcome that instantaneous drop, thereby allowing the output voltage/current to rise.

A signal processing system that exhibits this initial negative response (i.e. wanting more output, but actually getting less) resolving to a final positive output (i.e. wanting more output, and actually getting more) has what is known as a right half-plane zero (RHPZ) (this means that in the Laplace Domain, an (s-a) term exists in the numerator). The RHPZ is a well-known effect in many switching regulators that causes difficulties in stabilizing the feedback loop. Because the RHPZ problem stems from the initial inversion of the error signal as the switching regulator is correcting for a disturbance, i.e. a load increase. Typically, the solution is to slow switching regulator 100 sufficiently by incorporating a larger compensation capacitor 105 so that the inversion does not cause stability problems. Unfortunately, a larger compensation capacitor results in slower response time, thereby degrading performance of switching regulator 100.

SUMMARY OF THE INVENTION

A typical signal processing system, e.g. a switching regulator, can exhibit an initial negative response (i.e. wanting more output, but actually getting less) resolving to a final positive output (i.e. wanting more output, and actually getting more). This response cycle has what is known as a right half-plane zero (RHPZ). Unfortunately, a RHPZ can destabilize signal processing. Conventional techniques to cancel the RHPZ include slowing the response time of the switching regulator, thereby degrading its performance.

An improved method of canceling a RHPZ of a switching regulator can include detecting a predetermined error signal provided to a pulse width modulation (PWM) circuit, wherein the predetermined error signal is associated with the RHPZ. Once a RHPZ is detected, a ramp waveform provided to the PWM circuit can be temporarily lengthened, thereby canceling the RHPZ. Notably, temporarily lengthening the ramp waveform can be based on adjusting an RZ*CZ time constant. In one embodiment, the ramp waveform can be lengthened to create a left half-plane zero (LHPZ), which improves stability.

A switching regulator capable of canceling the RHPZ can include a pulse-width modulation (PWM) circuit, a feedback path, a ramp generator, and a compensation circuit. The PWM circuit can include a ramp input terminal and an error input terminal. The feedback path can be coupled between an output of the PWM circuit and the error input terminal. The ramp generator can be coupled to the ramp input terminal of the PWM circuit. The compensation circuit can be coupled between the ramp generator and the error input terminal of the PWM circuit, thereby allowing variations of the error signal provided to the PWM circuit to be coupled directly to a reference signal provided to the ramp generator.

Notably, the compensation circuit can dynamically modify this reference signal to cancel an initial effect of a right half plane zero (RHPZ). In one embodiment, the compensation circuit can include a resistor and a capacitor connected in series between the reference signal and the error input terminal of the PWM circuit. In another embodiment, the compensation circuit further includes a buffer having an input terminal connected to the resistor and capacitor and an output providing the modified reference signal to the ramp generator. In yet another embodiment, the compensation circuit includes a low pass filter. In yet another embodiment, the compensation circuit can include a variable resistor and a capacitor connected in series between the reference signal and the error input terminal of the PWM circuit.

DETAILED DESCRIPTION OF THE FIGURES

Figures 1A, 1B:
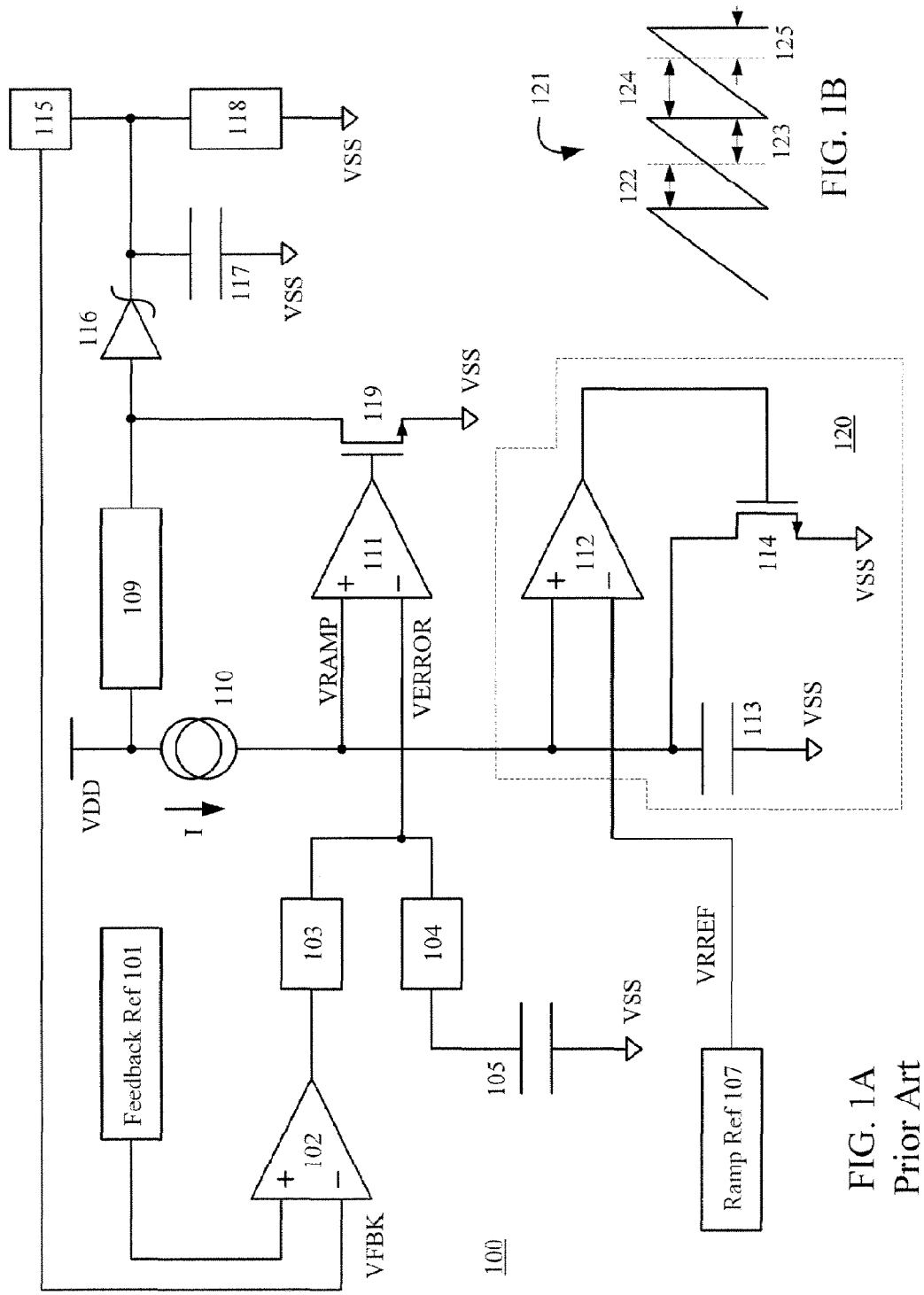
FIG. 1A illustrates a conventional switching regulator.
FIG. 1B illustrates a ramp waveform generated by the ramp generator of the conventional switching regulator.
Figure 2:
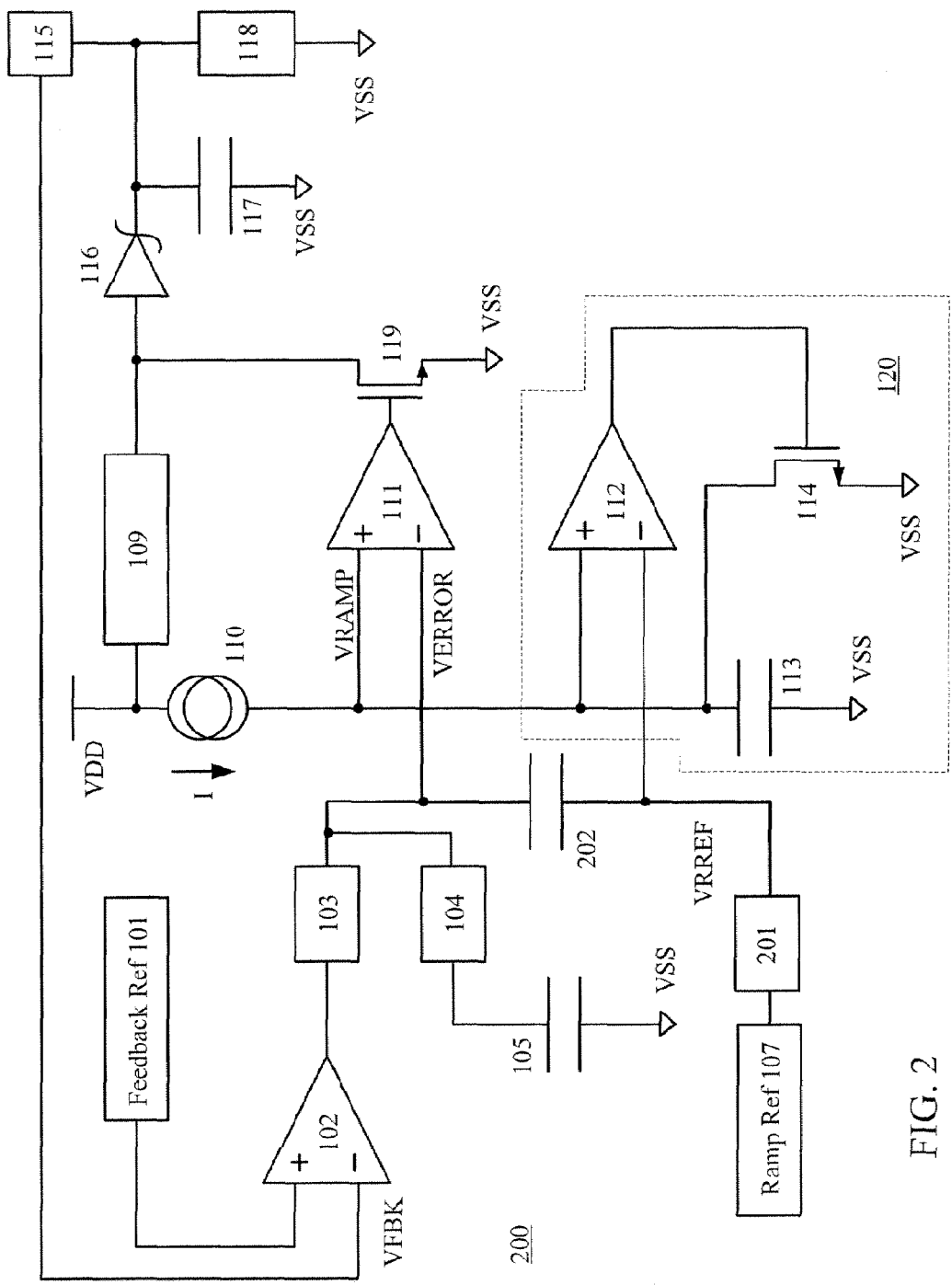
FIG. 2 illustrates an exemplary switching regulator that can advantageously convert a right half plane zero (RHPZ) to a left half-plane zero (LHPZ), thereby significantly improving loop stability.

FIG. 2 illustrates an exemplary switching regulator 200 that can advantageously convert a right half-plane zero (RHPZ) to a left half-plane zero (LHPZ), thereby significantly improving loop stability. Switching regulator 200 includes components that are similar to those in switching regulator 100. Similar components have identical reference numerals and similar functionality.

Notably, switching regulator 200 includes a set of additional compensation components compared to switching regulator 100. These compensation components, e.g. resistor (RZ) 201 and capacitor (CZ) 202 shown in FIG. 2, can be configured to dynamically modify the reference signal VRREF supplied to ramp generator 120. Specifically, resistor 201 and capacitor 202 are connected in series between ramp reference 107 and the line providing error signal VERROR. The line providing reference signal VRREF is connected to a node between resistor 201 dad capacitor 202.

If capacitor 202 is sufficiently large such that the time constant (product) of capacitor 202 and resistor 201 is greater than or equal to the effective time constant of the RHPZ, then variations of the error signal VERROR can be coupled directly to the reference signal VRREF. That is, when error signal VERROR swings more positive, the reference signal VRREF will also swing more positive. As a result, although the charge time increases relative to its last cycle, the discharge time can temporarily stay the same (as opposed to decreasing in switching regulator 100). In other words, ramp generator 120 with the help of the compensating components, i.e. capacitor 202 and resistor 201, can effectively modulate the frequency, i.e. increase the period of the ramp waveform.

In accordance with one aspect of the invention, because the ramp signal VRAMP can be lengthened for short positive excursions of the error signal VERROR, the initial effect of the RHPZ can be advantageously cancelled. Specifically, the adjustment (i.e. increase) of the RZ*CZ time constant causes the RHPZ to move to progressively higher frequencies (that advantageously have less effect on stability) until, when the RZ*CZ time constant is equal to the RHPZ time constant, the RHPZ goes to infinite frequency and is effectively cancelled. The resulting system now has a left half plane pole (LHPP) at the same frequency and time constant as the original RHPZ. This LHPP is considerably more stable than a RHPZ system.

Further, if the RZ*CZ time constant is lengthened beyond this predetermined value, then the zero moves to the left half-plane, thereby effectively becoming a left half-plane zero (LHPZ). At large values of RZ*CZ, this LHPZ comes close to and effectively cancels the LHPP, which can advantageously improve the stability of switching regulator 200.

Although illustrative embodiments of the invention have been described in detail herein with reference to the accompanying figures, it is to be understood that the invention is not limited to those precise embodiments. They are not intended to be exhaustive or to limit the invention to the precise forms disclosed. As such, many modifications and variations will be apparent.

For example, although a boost switching regulator is discussed above, duty cycle adjustment by coupling the error signal and the reference signal can also be used in fly-back regulators.

Figure 3:
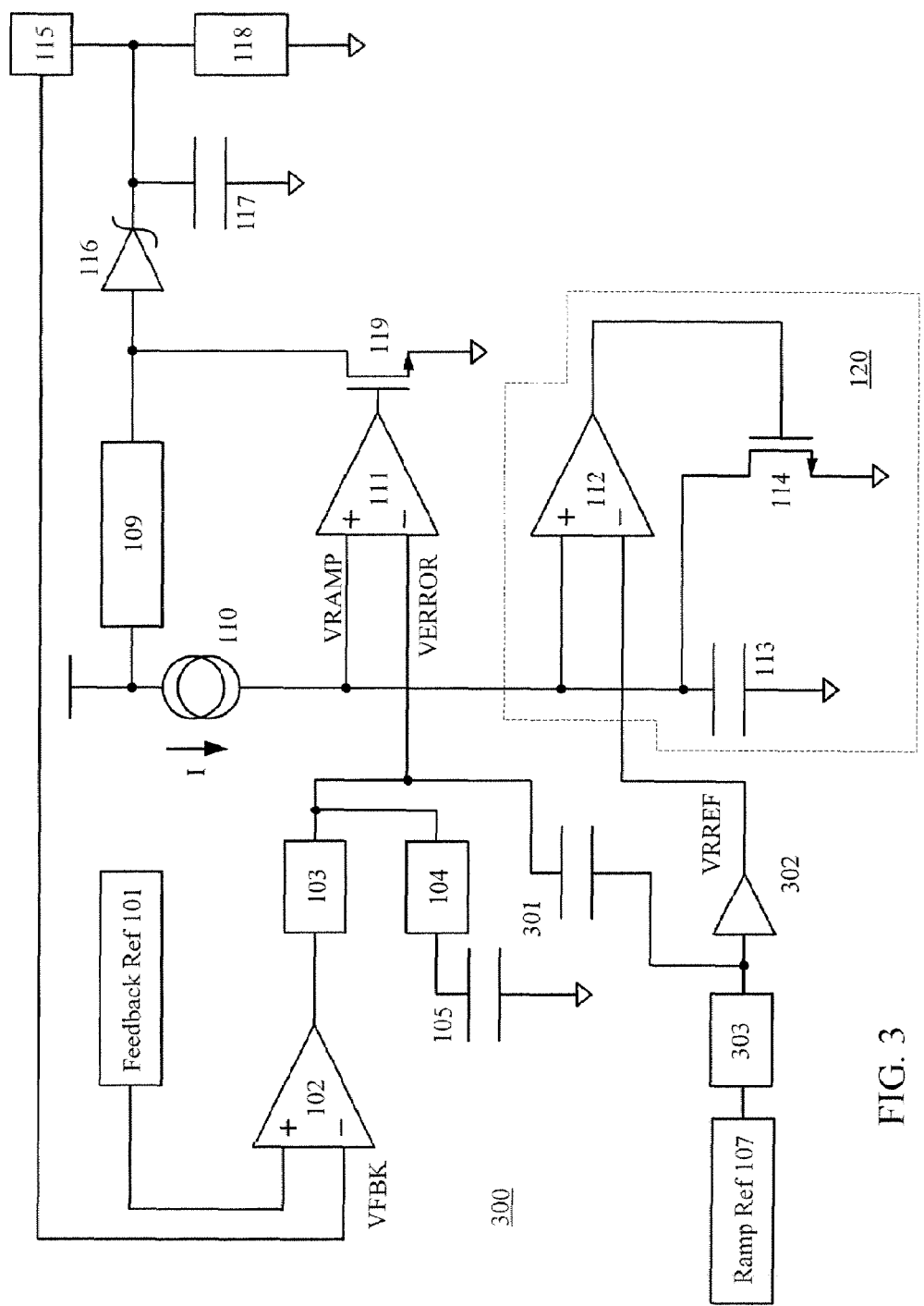
FIG. 3 illustrates another embodiment of a switching regulator that includes a capacitor, a buffer, and a resistor as compensation elements.

Notably, other configurations of capacitor 202 and resistor 201 as well as other compensation elements (e.g. buffers and variable elements) can be used to modify the compensation for differing load conditions. For example, FIG. 3 illustrates another embodiment of a switching regulator 300 that includes a capacitor 301, a buffer 302, and a resistor 303 as compensation elements. In this embodiment, capacitor 301 is connected between the line providing VERROR and a node between resistor 303 and buffer 302. Buffer 302 outputs the reference signal VRREF.

Figure 4:
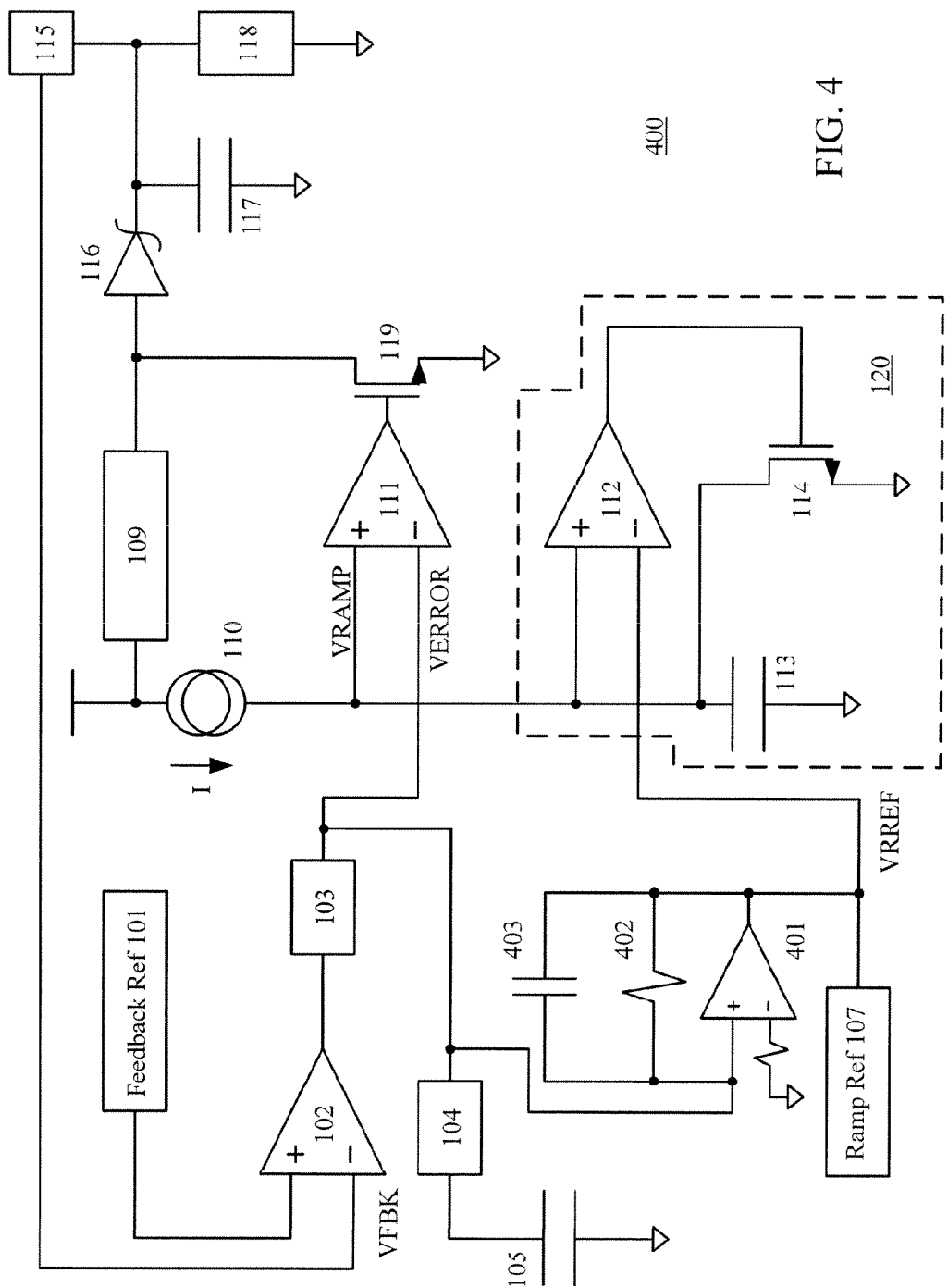
FIG. 4 illustrates yet another embodiment of a switching regulator that includes a low pass filter connected between the error signal VERROR and the reference signal VRREF.

FIG. 4 illustrates yet another embodiment of a switching regulator 400 that includes a low pass filter connected between the error signal VERROR and the reference signal VRREF. Specifically, the low pass filter includes an amplifier 401, a resistor 402, and a capacitor 403. Both resistor 402 and capacitor 403 are connected between the positive input terminal and the output terminal of amplifier 401. The positive input terminal is further connected to the line providing the error signal VERROR whereas the output terminal is further connected to the line providing the reference signal VRREF. The negative input terminal is connected to voltage VSS via a small resistor.

Figure 5:
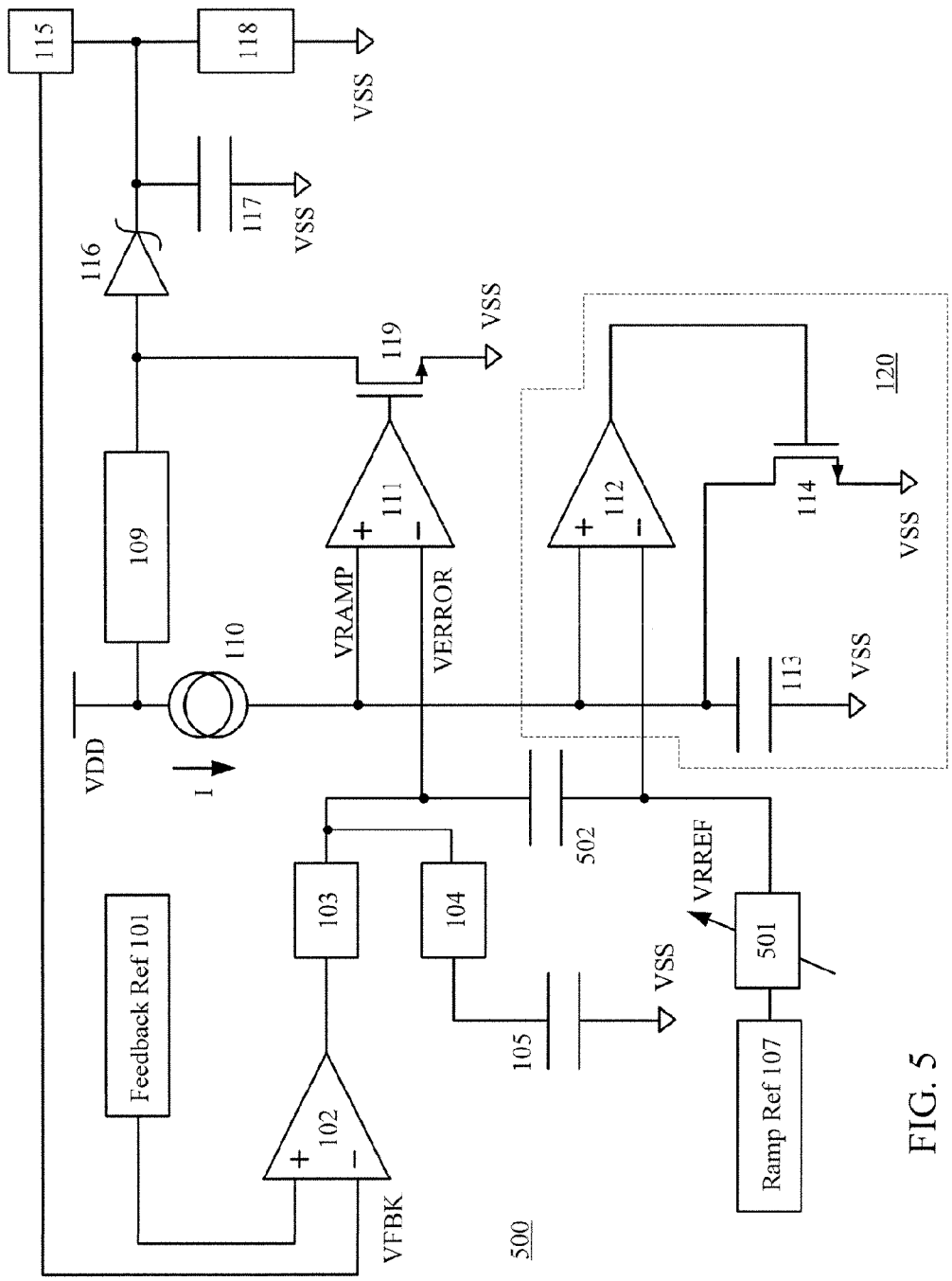
FIG. 5 illustrates yet another embodiment of a switching regulator that includes a variable resistor and a capacitor.

FIG. 5 illustrates yet another embodiment of a switching regulator 500 that includes a variable resistor 501 and a capacitor 502. In this embodiment, variable resistor 501 can advantageously fine-tune the time constant (RZ*CZ).

Accordingly, it is intended that the scope of the invention be defined by the following Claims and their equivalents.

The invention claimed is:

1. A switching regulator comprising:
   a pulse-width modulation (PWM) circuit including a ramp input terminal and an error input terminal;
   a feedback path coupled between an output of the PWM circuit and the error input terminal;
   a ramp generator coupled to the ramp input terminal of the PWM circuit; and
   a compensation circuit coupled between the ramp generator and the error input terminal of the PWM circuit, wherein the compensation circuit dynamically modifies a reference signal provided to the ramp generator to cancel an initial effect of a right half plane zero (RHPZ).

2. The switching regulator of claim 1, wherein the compensation circuit includes a resistor and a capacitor connected in series between the reference signal and the error input terminal of the PWM circuit.

3. The switching regulator of claim 2, wherein the compensation circuit further includes a buffer having an input terminal connected to the resistor and capacitor and an output providing the modified reference signal to the ramp generator.

4. The switching regulator of claim 1, wherein the compensation circuit includes a low pass filter.

5. The switching regulator of claim 1, wherein the compensation circuit includes a variable resistor and a capacitor connected in series between the reference signal and the error input terminal of the PWM circuit.

6. A switching regulator comprising:
   a pulse-width modulation (PWM) circuit including a ramp input terminal and an error input terminal;
   a feedback path coupled between an output of the PWM circuit and the error input terminal;
   a ramp generator coupled to the ramp input terminal of the PWM circuit; and
   means for dynamically modifying a reference signal provided to the ramp generator to cancel an initial effect of a right half-plane zero (RHPZ), the means for dynamically modifying being coupled between the ramp generator and the error input terminal of the PWM circuit.

7. A method of canceling a right half-plane zero (RHPZ) of a switching regulator, the method comprising:
   detecting a predetermined error signal provided to a pulse width modulation (PWM) circuit, the predetermined error signal associated with the RHPZ; and
   temporarily lengthening a ramp waveform provided to the PWM circuit, thereby canceling the RHPZ.

8. The method of claim 7, wherein temporarily lengthening the ramp waveform is based on adjusting a time constant of a compensation resistor and a compensation capacitor.

9. The method of claim 7, wherein the ramp waveform is lengthened to create a left half-plane zero (LHPZ).

* * * * *